US008221895B2

(12) United States Patent
Wicher

(10) Patent No.: US 8,221,895 B2
(45) Date of Patent: Jul. 17, 2012

(54) BASE PAPER FOR DECORATIVE COATING MATERIALS

(75) Inventor: Martina Wicher, Bissendorf (DE)

(73) Assignee: Technocell Dekor GmbH & Co. KG, Osbnabruck (DE)

( * ) Notice: Subject to any disclaimer, the term of this patent is extended or adjusted under 35 U.S.C. 154(b) by 12 days.

(21) Appl. No.: 12/809,244

(22) PCT Filed: Aug. 14, 2008

(86) PCT No.: PCT/EP2008/060712

§ 371 (c)(1), (2), (4) Date: Aug. 11, 2010

(87) PCT Pub. No.: WO2009/080376

PCT Pub. Date: Jul. 2, 2009

(65) Prior Publication Data

US 2010/0310894 A1 Dec. 9, 2010

(30) Foreign Application Priority Data

Dec. 21, 2007 (DE) ......................... 10 2007 062 838

(51) Int. Cl.
*B32B 5/16* (2006.01)

(52) U.S. Cl. ........ 428/532; 428/533; 428/534; 428/536; 428/537.5

(58) Field of Classification Search .................. 428/532, 428/533, 534, 536, 537.5
See application file for complete search history.

(56) References Cited

U.S. PATENT DOCUMENTS 7,014,893 B2 * 3/2006 Wicher et al. .............. 428/32.18

FOREIGN PATENT DOCUMENTS

| | | | |
|---|---|---|---|
| DE | 19728250 | | 1/1999 |
| DE | 19916546 | | 10/2000 |
| EP | 0421140 | | 4/1991 |
| EP | 0631880 | | 1/1995 |
| EP | 0806522 | * | 11/1997 |
| EP | 0806522 A | | 11/1997 |
| EP | 0947348 | | 10/1999 |
| EP | 01044822 | | 10/2000 |
| EP | 1176255 | * | 1/2002 |
| EP | 1584666 | | 10/2005 |
| EP | 01757731 | | 2/2007 |
| EP | 0964956 | | 5/2009 |
| GB | 1108549 | | 4/1968 |
| GB | 1142673 | | 2/1969 |
| GB | 1421210 | | 1/1976 |
| WO | WO93/00209 | | 1/1993 |
| WO | WO94/00523 | | 1/1994 |
| WO | WO95/17551 | | 6/1995 |
| WO | WO01/11139 | | 2/2001 |
| WO | WO2006/002761 | * | 1/2006 |
| WO | WO2007/000420 | | 1/2007 |
| WO | WO2007/144718 | | 12/2007 |

OTHER PUBLICATIONS

Das Papier, Issue 12 (1980), pp. 575-579.
International Search Report for WO09/080376, Mar. 3, 2009.

* cited by examiner

*Primary Examiner* — Leszek Kiliman
(74) *Attorney, Agent, or Firm* — Honigman Miller Schwartz & Cohn; Thomas A. Wootton; Jonathan P. O'Brien

(57) ABSTRACT

Base paper for decorative coating materials with a raw paper containing 5 to 55% by weight of a white pigment and/or filler and coated with a coating solution containing at least one water soluble modified starch with a specific molecular weight distribution.

7 Claims, No Drawings

BASE PAPER FOR DECORATIVE COATING MATERIALS

This application is the U.S. National phase of PCT Application No. PCT/EP2008/060712, filed, Aug. 14, 2008, which claims the priority of German Application No. DE 10 2007 062 838.4, filed Dec. 21, 2007. Both of these documents are incorporated herein in their entirety.

The invention relates to a base paper impregnable with thermosetting synthetic resins and to decorative coating materials obtainable therefrom.

The invention relates to a base paper impregnable with thermosetting synthetic resins and to decorative coating materials obtainable therefrom.

Decorative coating materials, so-called decorative papers or decorative films, are preferably used for surface coating during the manufacture of furniture and for interior finishing work, in particular laminate flooring. Decorative paper/decorative film should be understood to mean printed or unprinted papers impregnated with synthetic resin or impregnated with synthetic resin and surface treated. Decorative papers/decorative films are bonded to a carrier panel with size or adhesive.

Depending on the type of impregnation process, a distinction is made between decorative papers/decorative films with a fully impregnated paper core and so-called pre-impregnates in the case of which the paper is only partially impregnated on-line or off-line in the paper machine. Pre-impregnates should be understood to mean papers partially impregnated with resin in which the proportion of resin amounts to 10 to 35% by weight, based on the weight of the raw paper.

To bond decorative films onto wooden materials such as chipboard or MDF (medium density fibre) board, urea sizes or polyvinyl acetate (PAVC) sizes are usually employed. High pressure laminates are laminates formed by pressing several impregnated stacked papers together. The construction of these high pressure laminates usually consists of a transparent overlay producing maximum surface resistance, a resin-impregnated decorative paper and one or several phenol resin-coated kraft papers. Hardboard and wood chipboard, for example, as well as plywood are usually used as substrate.

In the case of the laminates produced by the short-cycle method (low pressure laminates), the decorative paper impregnated with synthetic resin is compressed directly with a substrate, e.g. a chipboard, using low pressure.

The decorative paper used with the above-mentioned coating materials is used in the white or coloured, printed or unprinted state.

To impregnate raw decorative papers, resins based on urea, melamine or phenol resins and containing formaldehyde are usually used. However, resins free from substances harmful to health, in particular formaldehyde-free synthetic resins based on styrene/acrylic acid ester copolymers are increasingly being used.

Regarding the application engineering properties, the raw decorative papers used as starting materials must satisfy certain requirements. These include a high opacity for better coverage of the substrate, a uniform formation and grammage of the sheet for homogeneous resin absorption, high lightfastness, high purity and homogeneity of the colour for good reproducibility of the pattern to be applied by printing, high wet strength for a smoothly-running impregnation process, an appropriate absorption capacity to achieve the necessary degree of resin saturation, dry strength which is important during rewinding operation in the paper machine and during printing in the printing machine. In addition, the internal bonding strength is of particular importance since it is a measure of the ease with which the raw decorative paper can be processed. Thus, the decorative paper/decorative film bonded on with size must not fray during processing steps such as sawing or drilling.

To produce a decorative surface, the raw decorative papers are printed. Preconditions for a satisfactory printed image with few imperfections and a high colour intensity are a high opacity, as smooth and homogeneous a surface topography as possible and a matched colour absorption behaviour of the paper surface.

For this reason, raw decorative papers are usually smoothed by means of so-called soft calenders, partly also by means of so-called Janus calenders. This treatment can lead to squashing of the paper surface and consequently to its compaction, having a negative effect on the resin absorption capacity.

The above-mentioned properties are greatly influenced by the impregnation of the raw decorative paper, i.e. the type of impregnating agent (impregnating resin) used.

The resins based on urea resins, melamine resins or phenol resins, which are usually used to impregnate the raw decorative papers, lead to brittle products with a poor tearing strength and printability.

The opacity required for decorative papers, which is determined decisively by the content of titanium dioxide, is partially lost as a result of impregnation with synthetic resins. Although the loss of opacity can be compensated for by increasing the titanium dioxide content, the strength of the paper is lost. This problem is to be solved according to EP 0 964 956 A1 by pre-impregnating the raw paper to be impregnated with a mixture of water-insoluble polymer, in particular a vinyl acetate/ethylene copolymer and a water-soluble, in particular a polyvinyl alcohol. However, the paper pre-impregnated in this way requires further improvement with respect to the internal bonding strength and the rate of impregnation.

The problem of the invention is to provide a base paper for decorative coating materials which does not exhibit the above-mentioned disadvantages and is characterised by a good impregnatability and good mechanical properties, in particular a high internal bonding strength. At the same time, a high opacity of the paper is to be retained.

This problem is solved by way of a base paper which comprises a raw paper containing 5 to 55% by weight of a white pigment and/or filler, which paper is coated with a coating solution containing at least one water soluble modified starch with a molecular weight distribution expressed by a polydispersity index Mw/Mn of 10 to 25. Modified starches exhibiting a polydispersity index of 15 to 23 are preferred.

In a particular embodiment of the invention, the raw paper is coated with an aqueous coating solution containing at least one water soluble modified starch with the molecular weight of starch molecules being preferably in the following ranges of average molecular weights (Mw):

- maximum 6% by weight of the molecules with a molecular weight of 0 to 1,000 g/mole, in particular 1 to 5% by weight,
- 5 to 20% by weight of molecules with a molecular weight of 1,000 to 5,000 g/mole, in particular 7 to 18% by weight,
- 20 to 40% by weight of molecules with a molecular weight of 5,000 to 25,000 g/mole, in particular 20 to 30% by weight,
- 20 to 45% by weight of molecules with a molecular weight of 25,000 to 200,000 g/mole, in particular 30 to 45% by weight, 6 to 22% by weight of molecules with a molecular weight of 200,000 to 1,000,000 g/mole, in particular 10 to 22% by weight, 0.5 to 5% by weight of molecules with a molecular of more than 1,000,000 g/mole, in particular 1 to 5% by weight.

Usually, the ratio of weight average to number average molecular weight Mw/Mn is given as polydispersity index. It provides information on the width of the molecular weight distribution curve.

The molecular weight distribution of the modified starches was determined by the starch manufacturer in the usual way by means of gel permeation chromatography (GPC). The GPC analysis was carried out using a chromatograph with Shodex KS columns. The elution agent was 0.05 M NaOH with a flow rate of 1 ml/min. Calibration was effected with Pullulan standards with known molecular weights.

The modified starch used according to the invention can be employed individually or as a mixture of different starches with a similar molecular weight distribution in the previously described range. However, it can also be used in mixture with further water-soluble polymers, e.g. a polyvinyl alcohol. In this case, polyvinyl alcohols with a degree of saponification of 88 to 98 mole % have proved to be particularly advantageous.

The water soluble modified starch used according to the invention is preferably a non-film-forming starch with an average molecular weight of preferably 100,000 to 250,000 g/mole. The film-forming starches usually used for surface sizing of papers are not suitable for the application according to the invention.

The modified starch used according to the invention is preferably used in the coating solution in a quantity of 20 to 100% by weight; however, a quantity of 50 to 100% by weight and in particular 70 to 100% by weight is preferred. The quantity data relate to the dried mass of the coating respectively.

In a further embodiment of the invention, the coating solution may contain further components in a quantity of 1 to 30% by weight, in particular 2 to 20% by weight. The quantity data relate to the binder mass (b.d.). The term binder should be understood to mean the modified starch according to the invention or a mixture of several modified starches, if necessary also in mixture with other water-soluble polymers.

As further components, inorganic pigments such as titanium dioxide, talcum, calcium carbonate and/or kaolin, organic pigments, dyes, viscosity regulators, defoaming agents and other additives suitable for use in the paper industry can be used.

The coating solution used for making the base paper according to the invention exhibits a total solid content, based on the dry mass, of 5 to 30% by weight, preferably 15 to 25% by weight, in particular, however, 20 to 25% by weight.

During the production of the coating solution, the starch is first prepared which is dissolved in water either cold, i.e. at room temperature up to maximum 60° C. and/or boiled at approximately 120 to 145° C. During this process, an approximately 35 to 45% solution with a pH value of 5 to 6 is produced. This is diluted with water to the desired solid content.

In a further step, the addition of further components and/or additives can take place in the form of an aqueous solution or dispersion.

The raw decorative papers are those which are neither internal sized nor surface sized. They consist essentially of pulps, pigments and fillers and the usual additives. Usual additives may be wet-strength agents, retention agents and fixing agents. Raw decorative papers differ from usual types of paper by the considerably higher proportion of filler or pigment content and the absence of any internal sizing or surface sizing common in the case of paper.

The raw paper to be impregnated according to the invention may contain a high proportion of a pigment or a filler. The proportion of the filler in the raw paper may amount up to 55% by weight, in particular 8 to 45% by weight, based on the basis weight. Suitable pigments and fillers are, for example, titanium dioxide, talcum, zinc sulphide, kaolin, aluminium oxide, calcium carbonate, corundum, aluminium silicate and magnesium silicate or mixtures thereof.

Softwood pulps (long fibre pulps) and/or hardwood pulps (short fibre pulps) may be used as a pulp for the manufacture of the raw papers. The use of cotton fibres and mixtures thereof with the above-mentioned types of pulp is also possible. A mixture of softwood/hardwood pulp in a ratio of 10:90 to 90:10, in particular 20:80 to 80:20 is particularly preferred. However, the use of 100% hardwood pulp has also proved advantageous. The quantity data relate to the mass of the pulp (b.d.).

The pulp mixture may also contain a proportion of cationically modified cellulose fibres of at least 5% by weight, based on the weight of the pulp mixture. A proportion of 10 to 50% by weight, in particular 10 to 20% by weight of the cationically modified pulp has proved to be particularly advantageous in the pulp mixture. The cationic modification of the cellulose fibres may take place by reaction of the fibres with an epichlorohydrin resin and a tertiary amine or by reaction with quaternary ammonium chlorides such as chlorohydroxypropyl trimethyl ammonium chloride or glycidyl trimethyl ammonium chloride. Cationically modified pulps and their manufacture are known e.g. from DAS PAPIER, issue 12 (1980), page 575-579.

The raw papers can be produced in a Fourdrinier paper machine or a Yankee paper machine. For this purpose, the pulp mixture can be grounded at a stock consistency of 2 to 5% by weight to achieve a freeness of 10 to 45° SR. In a blending chest, fillers such as titanium dioxide and talcum and wet-strength agents can be added and mixed thoroughly with the pulp mixture. In the case of the raw paper according to the invention, the use of a wet strengthening agent in a quantity of 0.8 to 2.0% by weight, in particular 1.0 to 1.8% by weight, based on the pulp (b.d.) has proved to be particularly advantageous. The high density pulp thus obtained can be diluted to a stock consistency of approximately 1% and, if necessary, further auxiliaries such as retention agents, defoamers, aluminium sulphate and other above-mentioned auxiliaries can be admixed. This low density pulp is passed to the wire section via the headbox of the paper machine. A fibre mat is formed and, after dewatering, the raw paper is obtained which is subsequently dried. The basis weight of the papers produced may be 15 to 200 g/m$^2$. However, raw papers with a basis weight of 40 to 100 g/m$^2$ are particularly suitable.

The application of the coating solution to be used according to the invention may take place in the paper machine or off-line by spraying, immersion, roll coating or blade coating (doctor blade). Application via size presses or film presses is particularly preferred. The coating solution can be applied onto the raw paper with a coating weight of 1 to 15 g/m$^2$ (b.d.). Since the basis weight of the paper preferably shall not be changed by coating a part of the pulp in the making up of the paper is replaced by the coating agent of the invention.

Drying of the coated papers takes place in the usual way by means of IR dryers or roller dryers within a temperature range of 120 to 180° C. to reach a residual moisture content of 2 to 8%.

After drying, the papers coated according to the invention are printed and impregnated and subsequently laminated onto different substrates, e.g. chipboard or fibreboard, using common methods.

No loss of opacity occurred on impregnation of the base paper according to the invention with thermosetting resins. The paper exhibits an improved internal bonding strength. Regarding further mechanical properties such as wet breaking load and dry breaking load, comparably good or even better results than those of the state of the art can be achieved.

The coating agent applied to the paper decreases swelling of the fibers in contact liquids and, thus, a change of the dimension in transversal direction (x-direction), longitudinal direction (y-direction) and thickness direction of the paper (z-direction). In particular, this reduced change of the dimension in z-direction results in a reduction of the volume of the paper to be filled with resin which is beneficial during the impregnation of the paper with an impregnation resin. The more dimension stable paper thus serves as a highly appropriate base for the later application of the impregnation resin with the consequence of needing less resin to achieve a saturated impregnation core. It was found that the reduction of the amount of resin is direct proportional to the amount of fibers in the paper.

Further, it was found that in spite of the coating according to the invention no reduction of pore size occurs in the paper sheet. In contrast, with an increased amount of coating agent applied to the sheet and with the basis weight of the sheet remaining the same, surprisingly the average pore size increases.

A further advantage consists of the fact that the base paper can be produced with high machine speeds of up to 1200 m/min. The speed of impregnation with synthetic resins can also be increased because optimum penetration times can be maintained. Penetration time should be understood to mean the time which a standard impregnating resin requires in order to penetrate from the open reverse side of the paper to the front of the paper without application of pressure.

The following examples serve as a further illustration of the invention. Data in percent by weight relate to the weight of the pulp, unless stated otherwise. Quantity ratio means the ratio of the mass and/or the weight ratio.

EXAMPLES

Example 1

A pulp suspension was prepared by grinding a pulp mixture consisting of 80% by weight eucalyptus pulp and 20% by weight pine sulphate pulp with a stock consistency of 5% to achieve a freeness of 33° SR (Schopper-Riegler). Subsequently, the addition of 1.8% by weight of epichlorohydrin resin took place as wet-strength agent. This pulp suspension was adjusted to a pH value of 6.5 using aluminium sulphate. Subsequently, a mixture of 30% by weight of titanium dioxide and 5% by weight of talcum, 0.11% by weight of a retention agent and 0.03% by weight of a defoaming agent was added to the pulp suspension and a raw decorative paper with a basis weight of approximately 73 g/m$^2$ and an ash content of approximately 23% by weight was produced. The weight specification data relate to the weight of the pulp (b.d.).

This raw paper was coated by means of a size press with an aqueous coating solution containing a thermally modified maize starch (starch I, table 1), (CAS 9004-53-9). This starch is available in commerce as a free flowing white powder which beyond the characteristic molecular weight distribution is characterised by a moisture of 11.5%, a pH value of 6,5, a viscosity according to Brookfield (100 rpm) of 185 mPas (batch cooked, 25% solution, 40° C.).

The coating solution was applied with four different application quantities. The solid content of the coating solution amounted to about 20% by weight. For this purpose, a 45% starch preparation was first produced and diluted with water to a concentration of 20% by weight by giving the starch into water and cooking it two minutes at 125° C. water vapor. The solution was then diluted with water to a concentration of 20% by weight.

The coated papers were subsequently dried at a temperature of about 120° C. to reach a residual moisture content of 2.5%. The coating weight after drying amounted to 2.1 g/m$^2$ (Example 1A), 4.9 g/m$^2$ (Example 1B), 9.8 g/m$^2$ (Example 1C) and 14.5 g/m$^2$ (Example 1D).

Example 2

The raw paper from Example 1 was coated by means of a size press with an aqueous coating solution containing the thermally modified maize starch (starch II, table 2), (CAS 9004-53-9). This starch is available in commerce as a free flowing white powder which beyond the characteristic molecular weight distribution is characterised by a moisture of 10.5%, a pH value of 6,25, a viscosity according to Brookfield (100 rpm, Sp 2) of 170 mPas (batch cooked, 15% solution, 40° C.).

The starch preparation was produced as in example 1. The solid content of the coating solution amounted to 25% by weight.

The coated paper was subsequently dried at a temperature of approximately 120° C. to reach a residual moisture content of 2.5%. The coating weight after drying amounted to 4.8 g/m$^2$.

Example 3

A raw paper produced as in Example 1, though with 100% eucalyptus pulp, was coated by means of a size press with an aqueous coating solution containing starch I as in Example 1. The solid content amounted to approximately 20%.

The coated paper was subsequently dried at a temperature of approximately 120° C. to reach a residual moisture content of 2.5%. The coating weight after drying amounted to 5 g/m$^2$.

Comparative Example V1

The raw paper from Example 1 was coated by means of a size press with an aqueous coating solution containing starch III (C-Film 07380)(Table 1). The solid content of the coating solution amounted to approximately 20% by weight.

The coated paper was subsequently dried at a temperature of approximately 120° C. to reach a residual moisture content of 2.5%. The coating weight after drying amounted to 5.1 g/m$^2$.

Comparative Example V2

The raw paper from Example 1 was coated by means of a size press with an aqueous coating solution containing a film-forming starch (C-Film® 05731). The solid content of the coating solution amounted to approximately 20% by weight. The preparation of the starch preparation took place as in Example 1.

The coated paper was subsequently dried at a temperature of approximately 120° C. to reach a residual moisture content of 2.5%. The coating weight after drying amounted to 5.1 g/m$^2$.

Comparative Example V3

The raw paper from Example 1 was coated by means of a size press with an aqueous coating mass containing a polyvinyl alcohol (Mowiol® 4-98) and a vinyl acetate/ethylene copolymer (Vinamul® 3265, Celanese) in a quantitative ratio of 10:90. The solid content of the coating solution amounted to approximately 10% by weight.

The coated paper was subsequently dried at a temperature of approximately 120° C. to reach a residual moisture content of 2.5%. The coating weight after drying amounted to 5 g/m$^2$.

The following Table 2 shows the results of the tests on the paper treated according to the invention in comparison with the state of art. The following characteristic properties were tested:

Internal Bonding Strength

The internal bonding strength is measured by means of an internal bond tester according to TAPPI T 569.

The test is carried out using EMCO IBT internal bond strength testers, whereas the structural strength of the paper being measured in the z-direction.

This measured value is indicated in J/m$^2$.

Smoothness

The determination of the smoothness takes place according to DIN 53 107 (TAPPI sm 48). During the test, the time is measured in which a certain quantity of air passes through the paper specimen and a polished glass panel.

which the paper becomes impregnated by resin vertically to the paper plane. The test is carried out with melamine resin MW550, 50%, without hardener and crosslinking agent, as test liquid.

As shown by Table 2, the base papers according to the invention have a higher internal bonding strength, a higher wet breaking load and dry breaking load. The penetration time was also considerably improved in the case of the base papers according to the invention in comparison with the state of the art. The opacity of the papers was retained.

TABLE 1

| Modified starches | | | |
|---|---|---|---|
| Mw distribution g/mole | Starch I | Starch II | Starch III |
| 0-1,000 | 4.42 | 1.83 | 12.20 |
| 1,000-5,000 | 16.36 | 7.63 | 34.41 |
| 5,000-25,000 | 28.68 | 22.59 | 47.50 |
| 25,000-200,000 | 35.54 | 42.74 | 5.89 |
| 200,000-1,000,000 | 12.5 | 20.71 | 0.00 |
| 1,000,000-5,000,000 | 2.48 | 4.50 | 0.00 |
| >5,000,000 | 0.02 | 0.00 | 0.00 |
| Polydispersity index | 22.3 | 19.0 | 45.2 |

TABLE II

| Test results | | | | | | | | |
|---|---|---|---|---|---|---|---|---|
| Test | 1A | 1B | 1C | 1D | 2 | V1 | V2 | V3 |
| Internal bond strength (Scott Bond J/m$^2$ | 217 | 282 | 554 | 908 | 278 | 232 | 298 | 198 |
| Smoothness, Bekk sec | 29 | 26 | 27 | 29 | 32 | 25 | 37 | 13 |
| Permeability to air (Gurley), sec/100 cm$^3$ | 26.60 | 39.30 | 84.80 | 158.00 | 104.1 | 22.30 | 89.60 | 40.00 |
| Dry breaking load, longitudinal, N/15 mm | 47.90 | 66.30 | 55.20 | 61.10 | 54.7 | 39.10 | 51.10 | 43.70 |
| Wet breaking load, longitudinal, N/15 mm | 10.19 | 16.20 | 16.27 | 16.20 | 16.46 | 8.49 | 9.14 | 10.08 |
| Penetration, reverse side, sec | 0.5 | 1.0 | 3.0 | 4.5 | 1.5 | 5.5 | 8.0 | 6.0 |
| Resin absorption, % | 76 | 71 | 60 | 38 | 69 | 72 | 66 | 70 |
| Cobb (water, 60 s, DIN EN 20535) reverse side, g/m$^2$ | 51.4 | 49.7 | 45.8 | 43.4 | — | — | — | 45.2 |

Permeability to Air (Gurley)

It is the purpose of the test to characterise the porosity of the paper structure. During this test, the time is measured which a certain amount of air requires to pass through a paper surface at a constant pressure. The measurement took place by means of an L&W densitometer 121 D. The unit of measurement is Gurley seconds/100 ml.

Dry Breaking Load

The measurement took place according to DIN EN ISO 1924-2 using FDP 40-tensile strength testers.

Wet Breaking Load

The measurement took place according to DIN ISO 3781 using FDP 40-tensile strength testers.

Penetration

By determining penetration, the behaviour of the base paper during impregnation is tested. Penetration is the time in

I claim:

1. A base paper for decorative coating materials which is impregnable with thermosetting resins, comprising a raw paper with 5 to 55% by weight of a white pigment and/or fillers, wherein said raw paper is coated with a coating solution comprised of at least one water soluble modified starch molecule with a polydispersity index Mw/Mn of 10 to 25 and with the molecular weight of said starch molecules selected from the following ranges of average molecular weights (Mw):

maximum 6% wt. of the molecules with a molecular weight of 0 to 1,000 g/mole 5 to 20% wt. of molecules with a molecular weight of 1,000 to 5,000 g/mole, 20 to 40% wt. of molecules with a molecular weight of 5,000 to 25,000 g/mole, 20 to 45% wt. of molecules with a molecular weight of 25,000 to 200,000 g/mole, 6 to 22% wt. of molecules with a molecular weight of 200,000 to 1,000,000 g/mole, 0.5 to 5% wt. of molecules with a molecular weight of more than 1,000,000 g/mole.

2. A base paper according to claim 1 wherein said coating solution contains a further water-soluble polymer.

3. A base paper according to claim 1 wherein the quantity of modified starch in said coating solution amounts to 20 to 100% by weight, based on the mass (bone dry).

4. A base paper according to claim 3 wherein said coating solution contains further components in a quantity of 1 to 30% by weight, based on the mass (bone dry).

5. A base paper according to claim 1 wherein said coating solution has a solid content of 20 to 25% by weight.

6. A base paper according to claim 1 wherein said coating solution is applied in a coating weight of 1 to 15 $g/m^2$ (bone dry) onto said raw paper.

7. Decorative paper or decorative coating material which comprises the base paper according to claim 1.

* * * * *